No. 620,821. Patented Mar. 7, 1899.
C. C. ABBEY & W. C. PHILIPS.
HOSE COUPLING.
(Application filed Oct. 9, 1897.)
(No Model.)
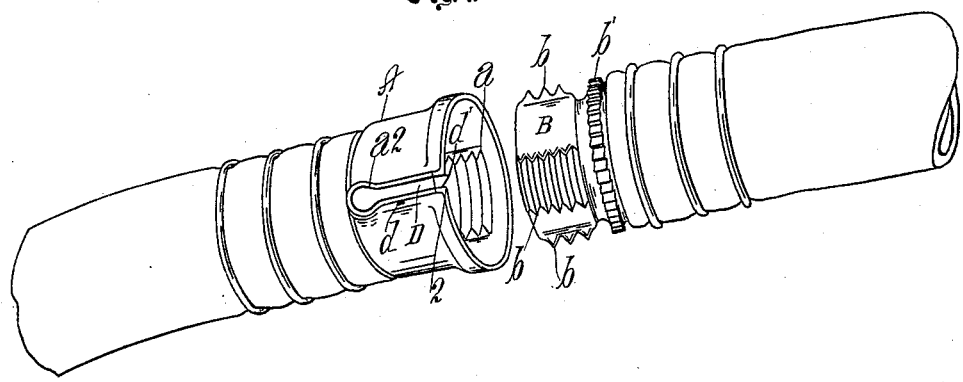
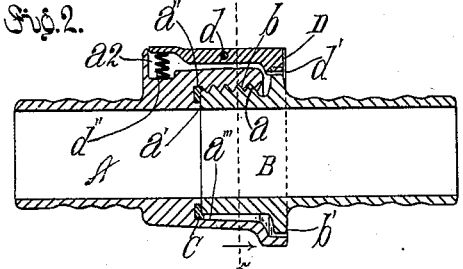
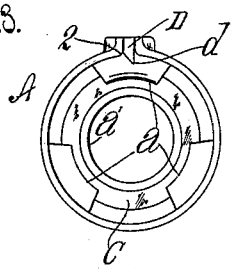 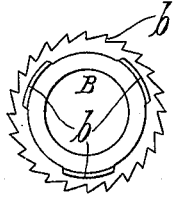
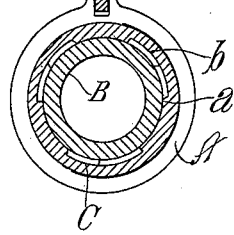
Witnesses
Percy Kingman.
E. A. Waterman.
Inventors
Charles C Abbey
and William C. Philips
by Townsend Bros.
Their Attys
THE NORRIS PETERS CO., PHOTO-LITHO., WASHINGTON, D. C.

UNITED STATES PATENT OFFICE.

CHARLES C. ABBEY AND WILLIAM C. PHILIPS, OF REDLANDS, CALIFORNIA.

HOSE-COUPLING.

SPECIFICATION forming part of Letters Patent No. 620,821, dated March 7, 1899.

Application filed October 9, 1897. Serial No. 654,711. (No model.)

*To all whom it may concern:*

Be it known that we, CHARLES C. ABBEY and WILLIAM C. PHILIPS, citizens of the United States, residing at Redlands, in the county of San Bernardino and State of California, have invented new and useful Improvements in Hose-Couplings, of which the following is a specification.

Our invention relates to those hose-couplings provided with a mutilated thread; and our invention particularly relates to the means which we employ for gaging the distance to which the members may be turned with relation to each other when the coupling is effected, so as to thereby insure that the coupling will not be turned so far as to release the mutilated threads from engagement with each other. In this respect we will state that with our device less than a third turn of the mutilated member with relation to the female member will fully effect the coupling and will form a perfect joint which will not leak.

One object of our invention is to provide a superior hose-coupling which can be almost instantly coupled or uncoupled, one which will form a perfect joint, and in which when coupling the parts together it will be impossible to turn them so far with relation to each other as to uncouple the device.

A further object of our invention is to provide a device of this character with means for preventing the accidental uncoupling of the parts and to so arrange the ratchet and click by which this is effected that the teeth of the ratchet will be thoroughly protected, and will not become accidentally bruised or battered, and will not injure shrubbery or flowers when the hose is dragged thereagainst in changing the hose from one position to another.

The accompanying drawings illustrate our invention.

Figure 1 is a perspective view showing our newly-invented hose-coupling ready to couple two pieces of hose. Fig. 2 is an axial section of our newly-invented hose-coupling coupled. Fig. 3 is an end elevation of the female member of the coupling. Fig. 4 is an end elevation of the male member of the coupling. Fig. 5 is a section on line 5 5, Fig. 2.

Our newly-invented hose-coupling comprises a male member and a female member provided, respectively, with mutilated threads $a\ b$, the female member A being provided with an interior nipple $a'$ to seat the end of the male member B to prevent the mutilated threads $a\ b$ of the two members from turning past each other, a washer-seat $a''$ being formed between the nipple and the walls $a'''$ of the threaded socket of the female member and extending beneath the threads $a$, and a washer C in such seat and normally extending outward beyond the end of the nipple, the walls of the male member B being thicker than the nipple, so as to seat upon the end of the nipple and also upon the washer. The joint between the nipple and male member is practically water-tight without using the compressible washer, but by the use of the compressible washer the joint is hermetically closed. The male member B may be provided with a ratchet $b'$, and a click D may be pivoted to the female member to engage the ratchet of the male member. The walls of the socket of the female member A will preferably extend far enough beyond the nipple $a'$ to chamber the ratchet $b'$. The click D is pivoted by a pivot $d$ in the click-seat $a^2$ in the female member, and the click D, which is pivoted in such seat, extends flush with the end of the female member, and its catch $d'$ projects through the notch 2 in the end of the female member. $d''$ indicates a spring in the click-seat $a^2$ to hold the click normally in engagement with the ratchet. The face of the click is normally flush with the outside of the female member. Thus it will be seen that the ratchet is chambered within the end of the female member, and is thereby protected from accidental disfigurement by being battered upon the walk, stones, &c. Furthermore, the sharp teeth of the ratchet are thus covered, so that they cannot be brought into engagement with the shrubbery or flowers, the bark of which would be readily torn by reason of the sharp teeth engaging therewith. It will be noted that the click D is parallel with the axis of the coupling, so that only a minimum projection beyond the normal diameter of the coupling is needed in order to properly chamber and protect the click. Furthermore, the walls of the notch 2 in the end of the female member act as shoulders, against which the click is carried when strain is applied thereagainst, so that all strain is thus supported by the wall of the notch and all strain taken off of the pivot.

In practical use the couplings will be joined by inserting the male member in the socket of the female member and against the washer C (which is made of some slightly-yielding substance, such as rubber, leather, &c.) and will be turned to screw the mutilated screws together. This compresses the washer until the end of the male member engages the end of the nipple. The parts are then screwed tightly together and the coupling is made.

The device is so arranged that when the coupling is turned so as to bring the mutilated threads into contact with each other along practically their entire length the end of the male member will be firmly seated against the metallic nipple, as shown in Fig. 2, and thereby it becomes impossible to turn the parts with relation to each other so far as to disengage the mutilated threads from their engagement with each other. Without this arrangement of positively stopping the rotation of the parts with relation to each other it would be necessary to provide one or more unmutilated threads, as has heretofore been proposed, and when this is done the coupling is no more effective than it would be were the unmutilated threads used without the mutilated threads.

Now, having described our invention, what we claim as new, and desire to secure by Letters Patent, is—

1. A hose-coupling comprising a male member and a female member provided respectively with mutilated threads, the female member being provided with an interior nipple to seat the end of the male member to prevent the mutilated threads of the two members from turning past each other, a washer-seat being formed between the nipple and the walls of the threaded socket of the female member and extending beneath the threads; a washer in such seat and normally extending outward beyond the end of the nipple; and the walls of the male member being thicker than the nipple so as to seat upon the end of the nipple and also upon the washer.

2. The combination set forth of a female member provided with a socket having mutilated threads and a nipple to seat the end of the male member, a washer-seat being provided between the nipple and the walls of the socket and extending beneath the mutilated threads, the outer end of the socket being adapted to seat a ratchet provided upon the male member; a washer seated in the washer-seat and normally projecting beyond the end of the nipple; a male member provided with mutilated threads and having its end adapted to seat upon the end of the nipple and upon the washer, said male member being provided with a ratchet adapted to be chambered in the female member when the two members are coupled together; a click parallel with the axis of the coupling, pivoted to the female member and working through a notch in the female member to engage the ratchet of the male member.

3. The combination of the male member provided with mutilated threads and a ratchet; a female member provided with mutilated threads and adapted to chamber the ratchet when the two members are coupled and provided with a notch for the passage of a click; and a click pivoted to the female member and adapted to play through the notch to engage with the ratchet, and arranged parallel with the axis of the coupling.

CHARLES C. ABBEY.
WILLIAM C. PHILIPS.

Witnesses:
JAS. MEDLAND,
A. E. SPRINGBORG.